H. W. HILL.
Machine for Opening Ditches.
No. 203,042. Patented April 30, 1878.
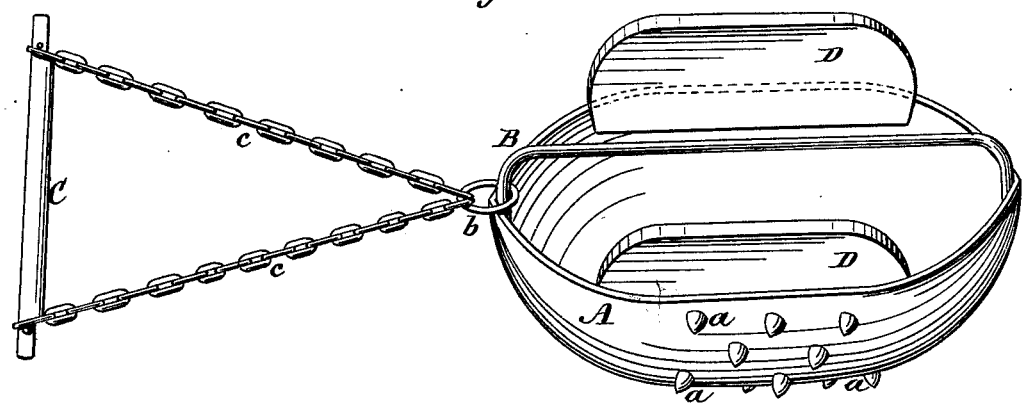
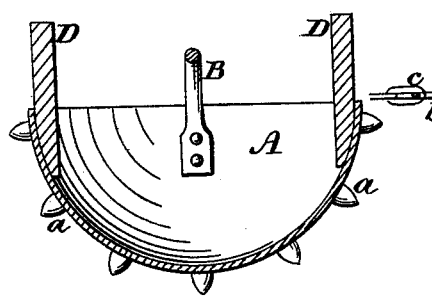
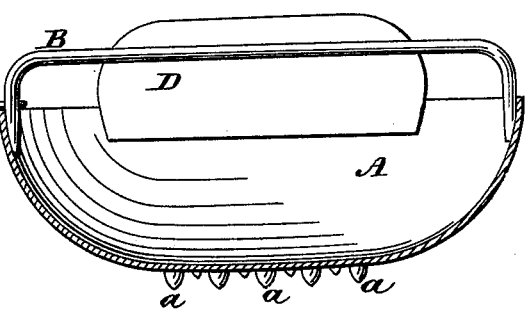
Witnesses:
Theo. Coleman.
John Bixby
Inventor
Hugh W. Hill
per Chas. P. Housum
Atty

UNITED STATES PATENT OFFICE.

HUGH W. HILL, OF DECATUR, ILLINOIS.

IMPROVEMENT IN MACHINES FOR OPENING DITCHES.

Specification forming part of Letters Patent No. 203,042, dated April 30, 1878; application filed March 25, 1878.

*To all whom it may concern:*

Be it known that I, HUGH W. HILL, of Decatur, in the county of Macon and State of Illinois, have invented a new and useful Improvement in Machines for Opening Ditches, which improvement is fully set forth in the following specification, reference being had to the accompanying drawings, in which—

Figure 1 is a perspective view of a machine embodying my invention. Fig. 2 is a transverse vertical section, and Fig. 3 is a longitudinal section.

The invention relates to a machine for opening ditches.

Grass and weeds grow up in ditches. These are generally mowed down. The stubble catches and holds the dirt, soon filling the ditches.

Heretofore ditches have usually been cleaned with a shovel or a plow and scraper. This is objectable, owing to the expense.

The object of my invention is to cut up the weeds and grass and stir up the dirt, the water in the ditch carrying them away; and this I accomplish by making a machine shaped like a boat, with teeth on the bottom and sides, which cut and tear up the weeds and dirt as the machine is drawn backward and forward through the ditch.

A rod attached to each end of the machine has a sliding ring attached thereto. Two chains are attached to this ring. A spreading-rod keeps the chains apart, and the animals drawing the machine are attached to the ends of the chains. This rod may be of different lengths, according to the width of the ditch, so the animals will not have to walk in the ditch.

This machine is especially valuable to use in opening the ditches or outlets from tiling, and may be used for opening new ditches when water can be obtained to follow up the machine or wash the loosened dirt away, and will be found useful in opening ditches in wet and marshy land.

A represents a boat, made of cast-iron or any other suitable material, and may be loaded to any weight desired. *a a* are teeth on the bottom and sides of the machine. B is an iron rod attached to each end of the machine. *b* is a ring thereon. *c c* are chains attached to the ring, and C a spreading-rod. D D are runners, to facilitate the transportation of the machine over the ground from place to place, the machine being turned upside down.

The operation of the machine is as follows: Horses or other animals are hitched to the ends of the chains, a spreading-rod of sufficient length being used, so that the animals need not walk in the ditch. As the machine is drawn along, it having been weighted so as to have the teeth engage with the bottom of the ditch, the teeth tear up the weeds and dirt and the water carries them away. When the end of the ditch is reached, the animals are turned around, the ring slides to the other end of the machine, and the machine is pulled to the starting-point, without requiring the machine to be taken from the ditch or turned around. The machine is dragged backward and forward in the ditch until it is the depth required.

What I claim is—

1. The boat-shaped machine A, provided with the teeth *a a*, substantially as described, and for the purpose set forth.

2. The rod B and ring *b*, in combination with the boat-shaped machine A, chains *c c*, and spreading-rod C, substantially as described, and for the purpose set forth.

3. The combination of the boat-shaped machine A, teeth *a a*, rod B, ring *b*, and runners D D, substantially as described, and for the purpose set forth.

HUGH W. HILL.

Witnesses:
 THEO. COLEMAN,
 JOHN BIXBY.